(12) United States Patent
Huan et al.

(10) Patent No.: US 7,982,147 B2
(45) Date of Patent: Jul. 19, 2011

(54) CENTRIFUGAL SWITCHING DEVICE OF SINGLE-PHASE INDUCTION MOTOR

(75) Inventors: Jianbin Huan, Jiangsu (CN); Ziming Zheng, Jiangsu (CN); Shenke Su, Jiangsu (CN); Feng Xiong, Jiangsu (CN); Zhendong Tang, Jiangsu (CN); Xiangzhi Li, Jiangsu (CN); Jiansong Lu, Jiangsu (CN)

(73) Assignee: Yijun Huan, Xilai Town, Jingjiang, Jiangsu (CN)

( * ) Notice: Subject to any disclaimer, the term of this patent is extended or adjusted under 35 U.S.C. 154(b) by 554 days.

(21) Appl. No.: 12/131,322

(22) Filed: Jun. 2, 2008

(65) Prior Publication Data

US 2009/0159418 A1 Jun. 25, 2009

(51) Int. Cl.
*H01H 35/10* (2006.01)
(52) U.S. Cl. .................................... 200/80 R; 310/68 E
(58) Field of Classification Search ............... 200/80 B, 200/80 R; 310/68 E; 318/924–928
See application file for complete search history.

(56) References Cited

U.S. PATENT DOCUMENTS

| 3,691,415 | A | * | 9/1972 | Hancock et al. | 310/68 E |
| 4,661,732 | A | * | 4/1987 | Gehrt | 310/68 E |
| 5,153,471 | A | * | 10/1992 | Ottersbach | 310/68 E |
| 6,710,271 | B2 | * | 3/2004 | Spedale et al. | 200/80 R |

\* cited by examiner

*Primary Examiner* — Renee Luebke
*Assistant Examiner* — Marina Fishman
(74) *Attorney, Agent, or Firm* — Global IP Services; Tianhua Gu

(57) ABSTRACT

A centrifugal switching device of a single-phase induction motor includes a centrifuge and pressure switches. The centrifuge includes a centrifugal sleeve, a centrifugal base, shaft coupling blocks, and a spring. The spring is directly fitted on the centrifugal base. Under a centrifugal force generated by the rotation of the motor, shaft coupling blocks I and II slide axially against an axial force of the spring, thus forcing an axial end surface of the centrifugal sleeve to be separated from contacts of the pressure switches, such that a starting winding of a stator ferrite-core coil of the single-phase induction motor is disconnected and a heater is turned on. The shaft coupling blocks I and II adopt a design with round transition, central sliding contact, and smooth rotation, thereby achieving a simple structure, convenient mounting, and safety usage.

10 Claims, 6 Drawing Sheets

CENTRIFUGAL SWITCHING DEVICE OF SINGLE-PHASE INDUCTION MOTOR

CROSS REFERENCE TO RELATED PATENT APPLICATION

This patent application claims the priority of the Chinese patent application No. 200710191471.5 filed on Dec. 19, 2007, which is incorporated herein by reference.

BACKGROUND OF THE INVENTION

1. Field of Invention

The present invention relates to a centrifugal switching device of a single-phase induction motor.

2. Related Art

Since single-phase induction motor has a simple but firm structure, and a single-phase power supply can be easily found, the single-phase induction motor serving as a driving motor for electrical appliances is widely applied in family, office, industry, and agriculture. However, the motor cannot activate automatically. Therefore, in order to generate a starting torque, besides an operating winding, a starting winding having a phase difference with the operating winding should be further provided. When the rotating speed of a rotator reaches 70%-80% of the synchronous speed, a centrifugal switching device is activated to disconnect the starting winding.

The centrifugal switch has an operating winding and a starting winding. The starting winding has a large resistance, and a start switch is serially-connected. When the rotating speed reaches 75%-80% of the synchronous speed, the centrifugal switch is turned off to disconnect the starting winding from the power supply. The operating winding has a small resistance and a large reactance, and the starting winding has a large resistance and a small reactance. Under different impedance ratios of the two-phase winding, the two-phase current has different phases, and thus a rotating magnetic field is generated to activate the motor with a required starting torque.

Hereinafter, the conventional centrifugal switching device of a single-phase induction motor is illustrated with the accompanying drawings.

Referring to FIGS. 1 and 2, the centrifugal switch driving device of a single-phase induction motor includes a sleeve 20, a slider 30, a centrifugal switch 60, a pair of governor weights 40, and a pair of springs 50. The sleeve 20 is rotatably integrated with a spindle 10 of the single-phase induction motor. The slider 30 is rotatably integrated with the sleeve 20 and formed with a collar 32 of an expanded diameter, and the collar 32, when sliding in an axial direction of the spindle 10 with respect to the sleeve 20, contacts a movable control rod 62 of a centrifugal switch 60, so as to turn on/off the centrifugal switch 60. The centrifugal switch 60 forms an open circuit from a secondary coil to a primary coil enwinding the stator of the single-phase induction motor due to the operation of the slider 30. The pair of governor weights 40 is joined to the slider 30 and capable of moving with respect to the same, and rotate under a centrifugal force generated by the rotation of the spindle 10, so as to force the slider 30 to move in the axial direction with respect to the sleeve 20. The pair of springs 50 has one end joined to the governor weights 40 respectively, and provides an elastic force in a direction of drawing the governor weights 40 closer.

The centrifugal switch 60 includes a housing 61 with a certain internal space, a movable control rod 62, a spring 63, a first leaf spring switch control rod 65, a second leaf spring switch control rod 67, a secondary coil terminal 68, a heater power terminal 69a, and a heater power terminal 69b. The movable control rod 62 is constituted by a hinge axis 62a hinged to the housing 61 and serving as a reference, a collar contact portion 62b formed on an opening portion of the housing 61 and exposed for contacting the above collar 32, and a contact driving portion 62c protruding toward the internal side of the housing 61. The spring 63 is used for elastically supporting the contact driving portion 62c of the movable control rod 62. The first leaf spring switch control rod 65, mounted adjacent to the contact driving portion 62c, has one side fixed to a primary coil terminal 64, and protrudes out a certain length in order to gain elasticity. The second leaf spring switch control rod 67, mounted adjacent to the contact driving portion 62c, has one side fixed to a heater power terminal 66, and protrudes out a certain length to gain elasticity. The secondary coil terminal 68 and the heater power terminal 69a are correspondingly mounted at two sides of the other distal end of the first leaf spring switch control rod 65, and are controlled by the first leaf spring switch control rod 65 to turn on/off. The heater power terminal 69b is mounted adjacent to the other distal end of the second leaf spring switch control rod 67, and is controlled by the second leaf spring switch control rod 67 to turn on/off.

Moreover, in order to turn on/off the first leaf spring switch control rod 65 and the second leaf spring switch control rod 67, a pressure should be exerted. Therefore, at an distal end of the above contact driving portion 62c, a pressing protrusion 62d protruding a certain height is respectively formed at a position adjacent to the first leaf spring switch control rod 65 and the second leaf spring switch control rod 67.

Based on the above structure, the conventional centrifugal switch driving device of a single-phase induction motor operates in the following manner.

When the spindle 10 stops, under the elastic force of the spring 50, the governor weights 40 are set at an original position close to the spindle 10, and the slider 30 is disposed at a position far from a guide device. At this time, as shown in FIG. 2, the collar contact portion 62b of the movable control rod 62 remains in a pressed state via the collar 62. Moreover, as the pressing protrusions 62d formed at the distal end of the contact driving portion 62c respectively exert a pressure on the first leaf spring switch control rod 65 and the second leaf spring switch control rod 67, the distal ends of the two control rods are respectively connected to the secondary coil terminal 68, such that the primary coil terminal 64 is connected to the secondary coil terminal 68. Thereby, a power is supplied to the primary coil and the secondary coil, and the spindle 10 starts rotating.

Once the rotating speed of the spindle 10 reaches 70%-80% of the synchronous speed, the centrifugal force exerted on the governor weights 40 is larger than the pulling force of the spring 50. Thus, one side of each governor weight 40 moves outward along with the guide device, and meanwhile the other side movable with respect to the slider 30 moves toward the guide device. In this manner, the slider 30 moves in the axial direction of the spindle 10 toward the guide device.

At this time, the collar 32 originally exerting a pressure on the collar contact portion 62b of the movable control rod 62 is removed, so as to release the collar contact portion 62b from the pressed state. Moreover, under the elastic force of the spring 63 for elastically supporting the contact driving portion 62c, the movable control rod 62, as shown in FIG. 2, rotates counterclockwise.

Along with the rotation of the movable control rod 62, the pressing protrusions 62d formed at the distal end of the contact driving portion 62c also release the pressure exerted on the first leaf spring switch control rod 65 and the second leaf spring switch control rod 67 respectively. Therefore, the first leaf spring switch control rod 65 and the second leaf spring switch control rod 67 moves toward the movable control rod 62 under the elastic forces of their own. At this time, the distal end at the other side of the first leaf spring switch control rod 65 assumes a turn-off state relative to the secondary coil terminal 68 and assumes a turn-on state relative to the heater connecting terminal 69a, and the second leaf spring switch control rod 67 turns from a turn-off state to a turned-on state relative to the heater connecting terminal 69b. That is, when turning into an open-circuit state, the primary coil and the secondary coil assume a closed-circuit state relative to the heater connecting terminal 69a, and thus the spindle 10 continues to rotate only by the power provided for the primary coil.

In view of the above, in the conventional centrifugal switch of a single-phase induction motor, when the motor rotates and reaches a certain rotating speed, the governor weights used for balancing the weight stretch in the radial direction under the centrifugal force, and thus the movable collar slides along the spindle. Due to the movement of the movable collar, the movable control rod of the centrifugal switch is driven to operate the switches in the housing, and as the governor weights stretching in the radial direction under the centrifugal force are pulled by the springs during the operation, once the motor stops, the governor weights will restore to their original positions under the elastic restoring force of the springs. In the above processes, the following problems may occur. As the movable control rod 62 always operates at one side of the circle, the slider 30 may be easily seized during the actuation, and in the long run, the spring may rupture or the governor weights may generate noises. Further, the structure of the movable control rod 62 is complicated and constituted by a plurality of different parts, so during the assembling of the whole movable portion, additional processes are needed, thus prolonging the assembling time and reducing the productivity.

Meanwhile, the conventional product also has a problem that, electric sparks may easily occur due to a long switching time during the operation of the first leaf spring switch control rod and the second leaf spring switch control rod in the switching structure, and a large transient current will be generated to damage the motor and even cause fire.

SUMMARY OF THE INVENTION

Accordingly, the present invention is directed to a centrifugal switch driving device of a single-phase induction motor, which may effectively overcome the defects in the conventional art. The centrifugal switching device of a single-phase induction motor provided by the present invention includes a centrifugal sleeve, a centrifugal base, a first shaft coupling block (also referred to as a shaft coupling block I), a second shaft coupling block (also referred to as a shaft coupling block II), a spring, and pressure switches. The present invention is characterized in that: the first and second shaft coupling blocks are designed to be coupled through a straight pin, and have a smooth rotation without making any noise; the first and second shaft coupling blocks are designed to slide axially to prevent the centrifugal switch from being easily damaged; the spring is directly fitted on an outer cylindrical surface of the centrifugal base, the centrifugal sleeve moves axially under a uniform force exerted by the spring; and an axial end surface of the centrifugal sleeve transiently releases contacts of the pressure switches.

The technical solutions adopted by the present invention for solving the technical problem are as follows.

1. The conventional centrifuge has the following defects: a centrifugal hammer and the centrifugal sleeve contact in a linear way, the centrifugal hammer is usually made of metal, and the centrifugal sleeve is usually made of plastic. Thereby, after a long time of operation, the centrifugal sleeve will be abraded and separated from the centrifugal hammer, and thus the stated functions cannot be achieved. However, in the present invention, the centrifugal switch of a motor employs the first and second shaft coupling blocks with round transition, central sliding contact, and smooth rotation without making any noise, thereby solving the defects in the above conventional structure.

2. The spring (12) in the conventional centrifugal switch operates in the radial direction of the spindle (10), such that the centrifugal sleeve (16) suffers a non-uniform force. However, the spring (12) in the present invention is directly fitted on the centrifugal base (17), and operates in the axial direction of the spindle (10), thus having a simple and practical structure.

3. The centrifugal hammer of the conventional centrifuge has to be mounted passing through a slide bar and engaged with the spring, so the fabrication and assembling processes are difficult. On the contrary, the spring in the present invention is directly fitted on the centrifugal base, and the shaft couplers 1 and 2 are mounted through a pin, which is rather simple and convenient.

4. The axial end surface of the centrifugal sleeve (16) transiently releases the contacts (112) of the winding pressure switch (22) and the heater pressure switch (25), and the pressure switches suffer a uniform force.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The present invention will be further illustrated below with the accompanying drawings.

Figure 1:
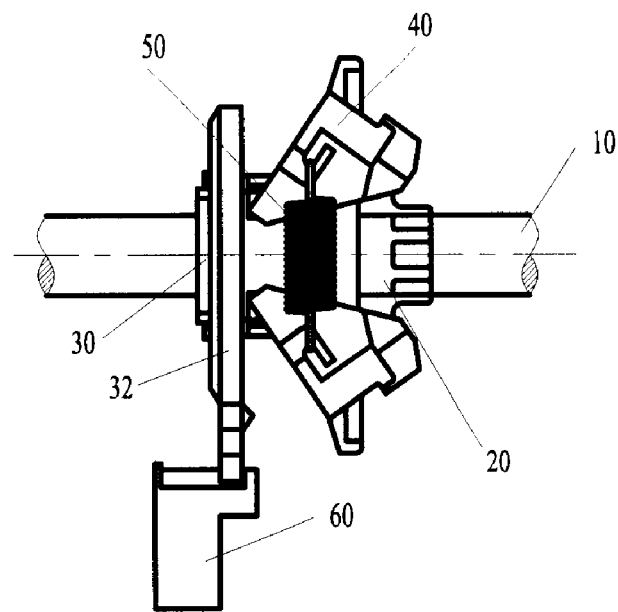
FIG. 1 is a base view of a conventional centrifugal switching device of a single-phase induction motor.
Figure 2:
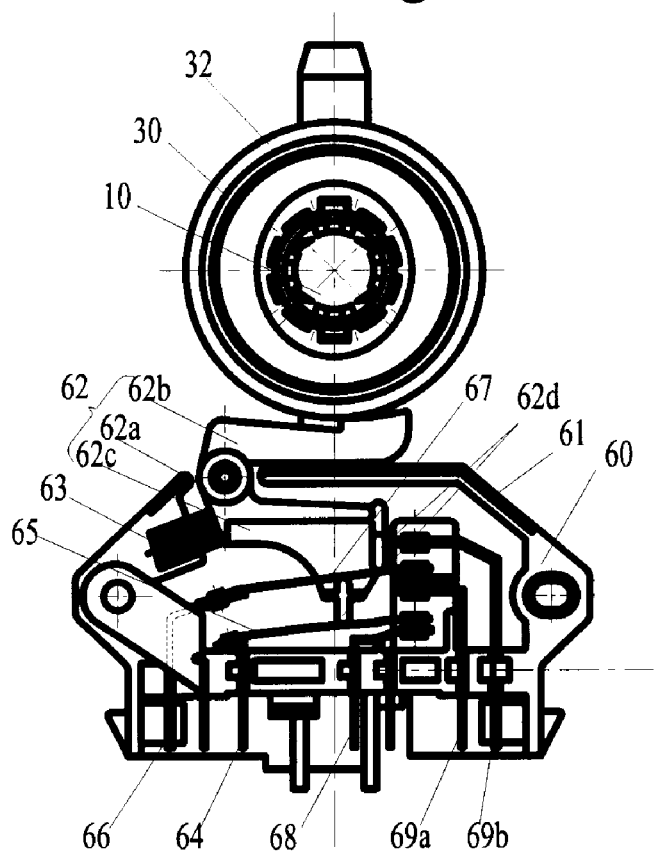
FIG. 2 is a cross-sectional side view of the conventional centrifugal switching device of a single-phase induction motor.
Figure 3:
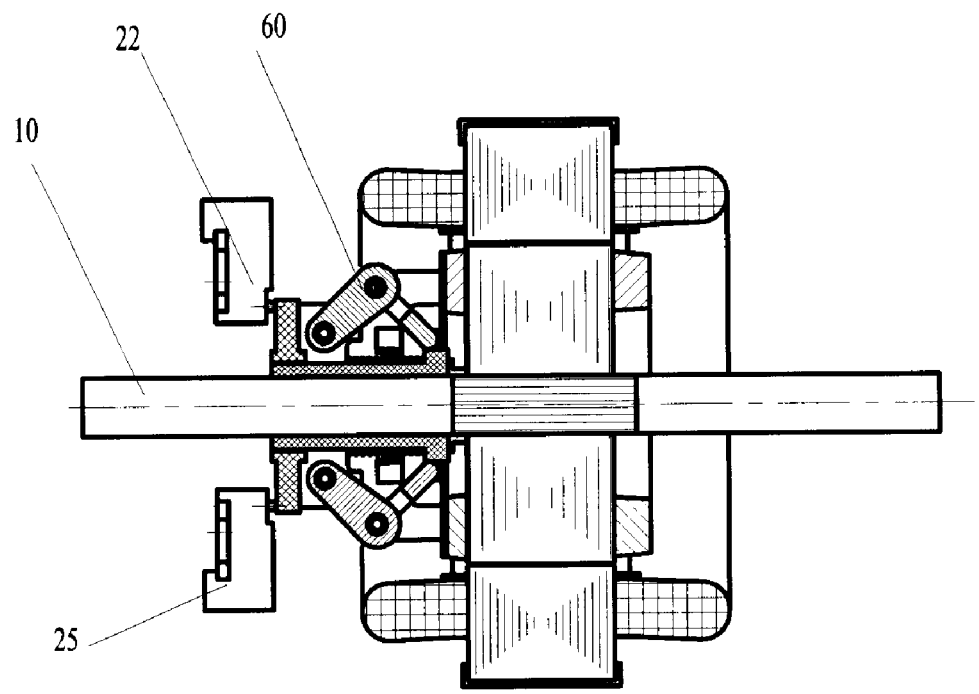
FIG. 3 is a schematic view of the structure of the present invention.
Figure 4:
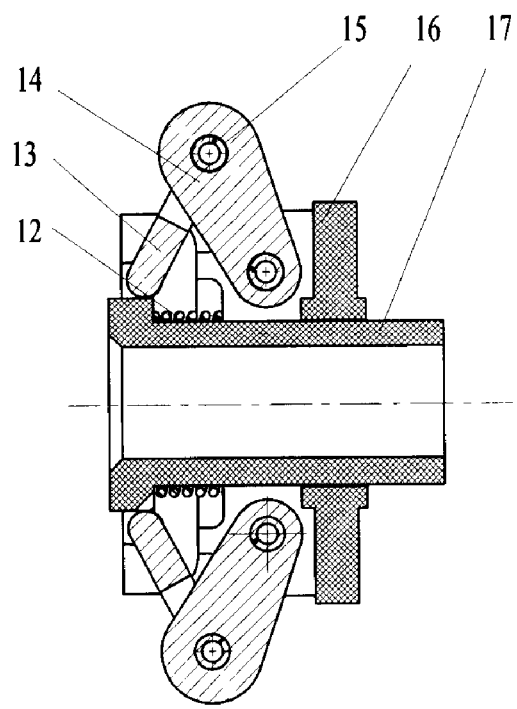
FIG. 4 shows a centrifuge.

Referring to FIGS. 3 and 4, a single-phase induction motor includes a centrifugal switch (60), a winding pressure switch (22), a heater pressure switch (25), and a spindle (10). Under the centrifugal force generated by rotation, the centrifugal sleeve (16) rotating together with the spindle of the motor makes the first shaft coupling block (13) and the second shaft coupling block (14) slide in an axial direction of the spindle, so as to be separated from the winding pressure switch (22) to disconnect the starting winding enwinding the single-phase induction motor, and to be separated from the heater pressure switch (25) to turn on the heater. When the rotating speed is lowered, the centrifugal sleeve (16) is restored by the force of a spring. The spring (12) in the conventional centrifugal switch operates in the radial direction of the spindle (10), such that the centrifugal sleeve (16) suffers a non-uniform force. However, the spring in the present invention is directly fitted on the centrifugal base (17), and operates in the axial direction of the spindle (10), so the centrifugal sleeve (16) suffers a uniform force, and has a simple and practical structure.

The first shaft coupling block (13) and the second shaft coupling block (14) are connected through a straight pin (15), the first shaft coupling block (13) is connected to the centrifugal base (17), and the second shaft coupling block (14) is connected to the centrifugal sleeve (16). The spindle (10) is interference fit into an inner hole of the centrifugal base (17). The fast rotation of the spindle (10) propels the centrifugal sleeve (16) and the centrifugal base (17) to rotate at a high speed. Thus, when the rotating speed reaches 70%-80% of the synchronous speed of the motor, the centrifugal sleeve (16) moves in the axial direction under the effect of the centrifugal force, such that the axial end surface of the centrifugal sleeve (16) is separated from the two winding pressure switches (22), so as to disconnect the starting winding.

Figure 5:
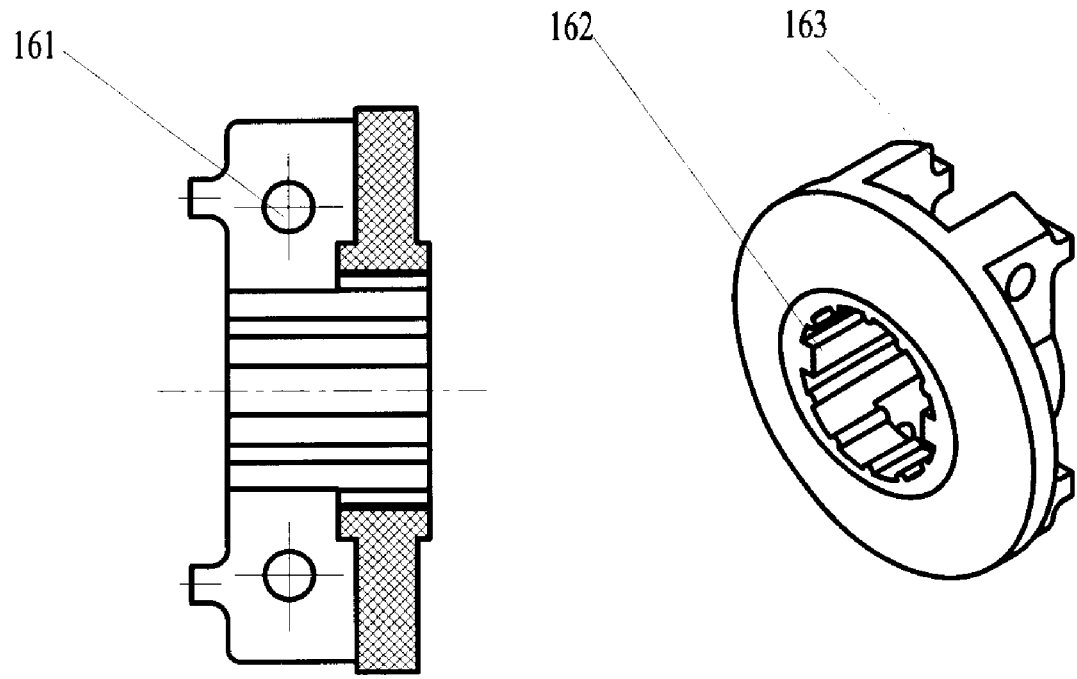
FIG. 5 shows parts of a centrifugal sleeve.

FIG. 5 shows parts of the centrifugal sleeve (16). A pin hole (161) is connected to a pin hole (141) of the second shaft coupling block (14), and a guide block (162) matches a guide slot (173) in the centrifugal base (17), such that the centrifugal sleeve (16) moves in an axial direction.

Figure 6:
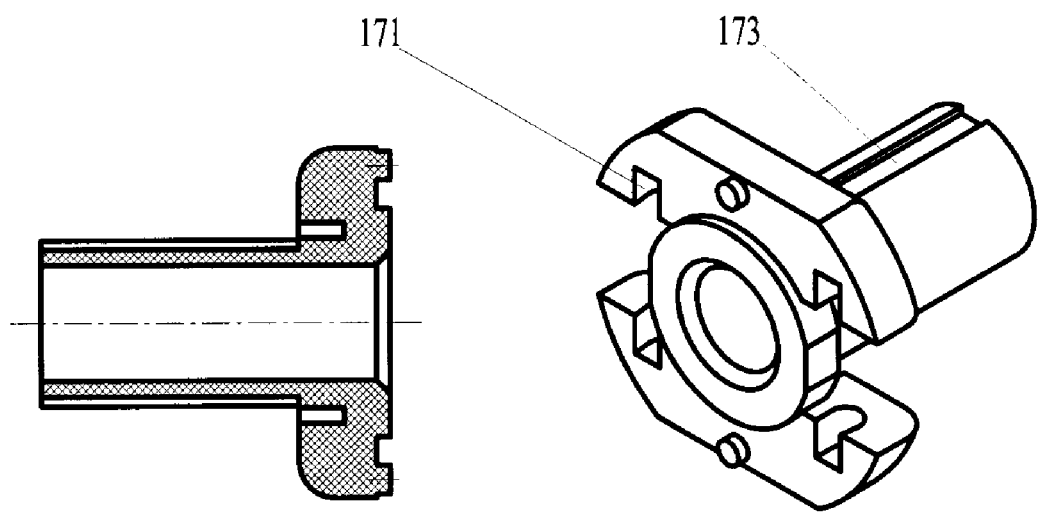
FIG. 6 shows parts of a centrifugal base.

FIG. 6 shows parts of the centrifugal base. The spring (12) is directly fitted on an outer cylindrical surface of the centrifugal base (17). When the rotating speed is lowered, the centrifugal sleeve (16) is restored by the force of the spring (12). The spring (12) in the conventional centrifugal switch operates in the radial direction of the spindle (10), such that the centrifugal sleeve (16) suffers a non-uniform force. However, the spring in the present invention is directly fitted on the centrifugal base (17), and operates in the axial direction of the spindle (10), thus achieving a simple and practical structure.

Figure 7:
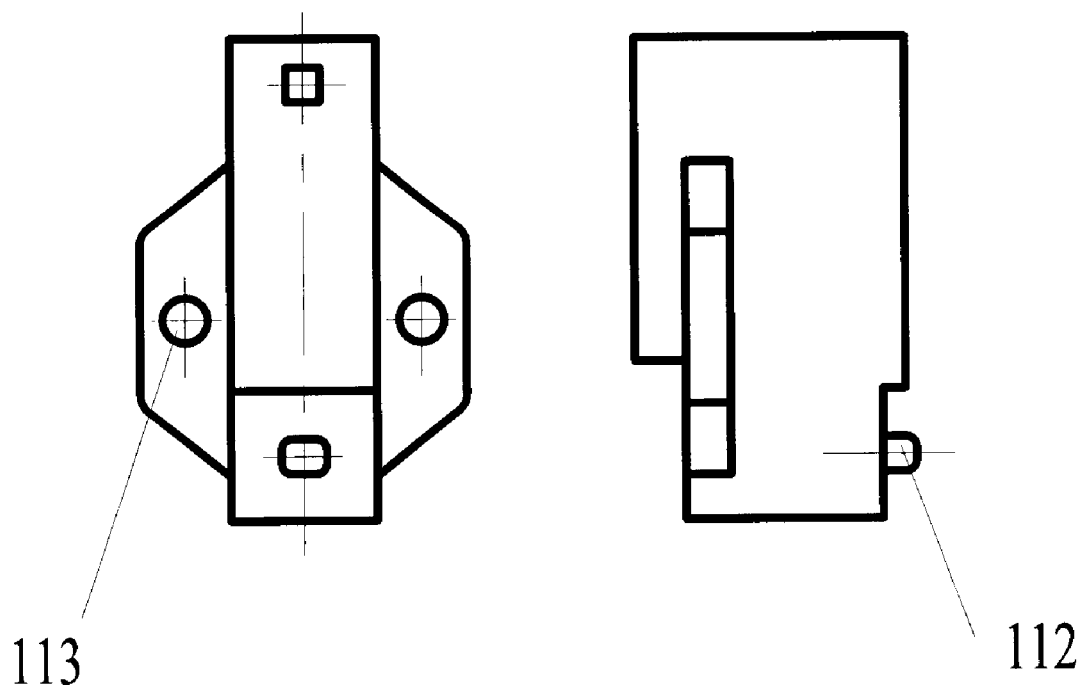
FIG. 7 shows a pressure switch.

FIG. 7 shows a pressure switch, in which the winding pressure switch (22) and the heater pressure switch (25) each have a contact (112) and a rivet hole (113), and the rivet holes (113) are directly riveted to the end covers.

Figure 8:
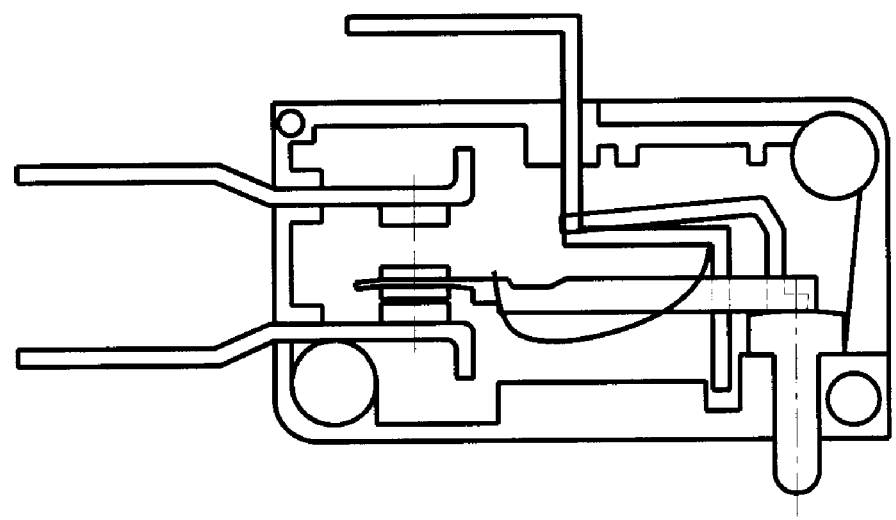
FIG. 8 is a schematic view of a normal-off pressure switch.

FIG. 8 is a schematic view of a normal-off pressure switch. When the pressure switch is in the normal-off state, a normal-off contact is in a normal-off state under the effect of a spring sheet 1 and a spring sheet 2.

Figure 9:
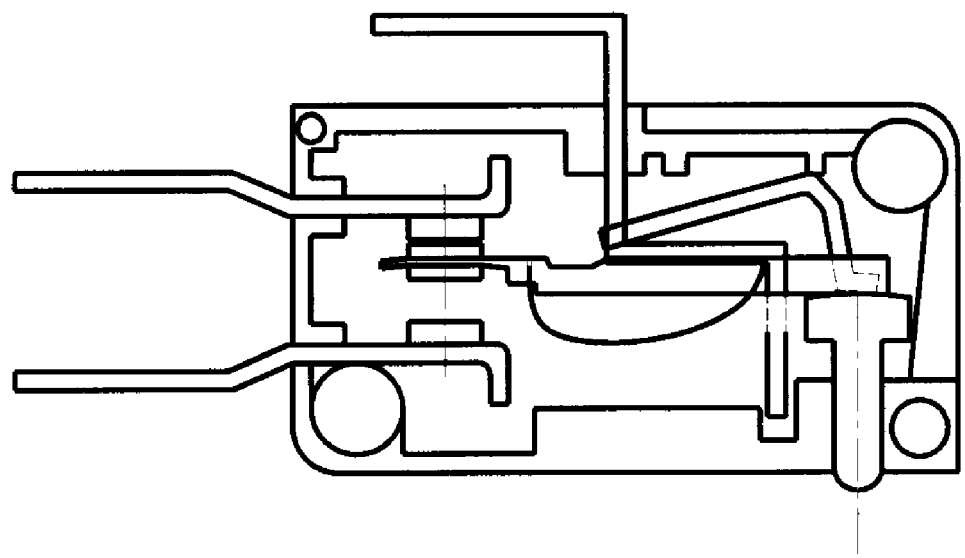
FIG. 9 is a schematic view of a normal-on pressure switch.

FIG. 9 is a schematic view of a normal-on pressure switch. When an operation button moves upward under an external mechanical force, the normal-off contact quickly moves downward under the effect of the spring sheets 1 and 2, and a contact at the right end of a moveable spring turns to contact a normal-on contact, so as to realize the circuit switching. When the external force is removed, the contact will switch transiently under the restoring force of the spring.

The pressure switch is a device having a small displacement and doing transient action. Under a small force and after a certain displacement, the contact of the pressure switch acts quickly to accomplish the circuit switching. When an external mechanical force is exerted on the operation button, the operation button quickly moves downward to stretch the spring via a hook. When the spring is stretched to a certain extent, the moveable spring quickly moves downward, and the contact at the right end of the moveable spring turns to contact the normal-on contact below, so as to realize the circuit switching. When the external force is removed, the contact will switch transiently under the restoring force of the spring.

Figure 10:
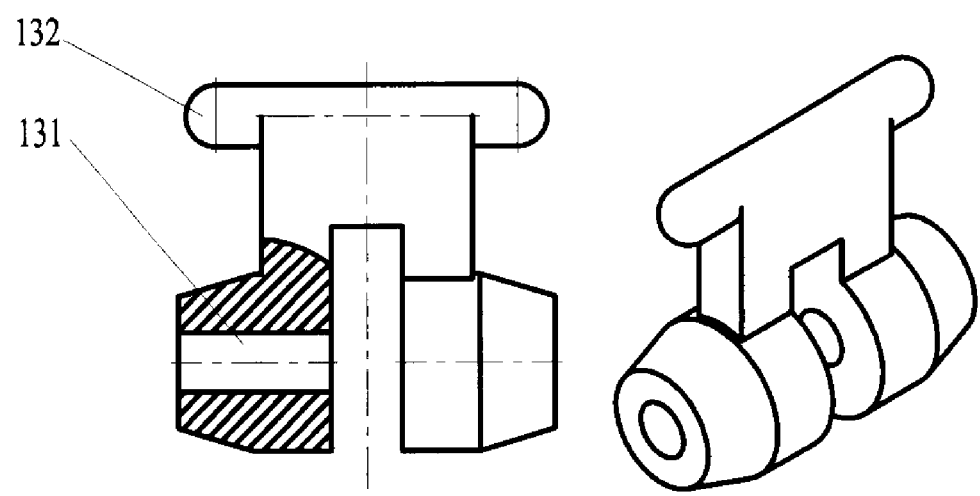
FIG. 10 shows a first shaft coupling block.
Figure 11:
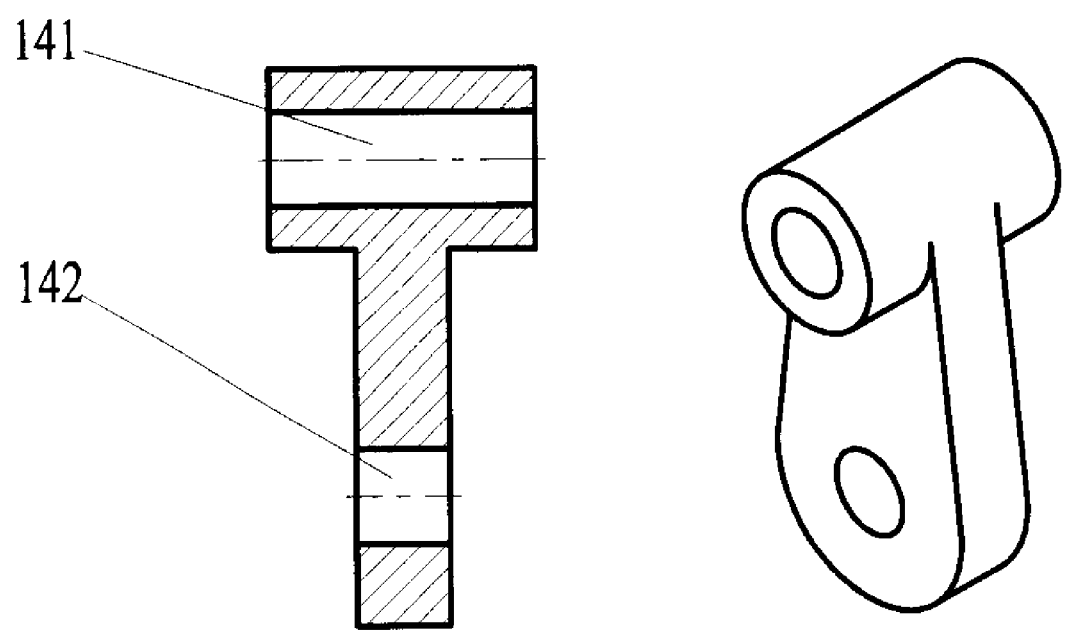
FIG. 11 shows a second shaft coupling block.

Referring to FIGS. 10 and 11, the pin hole (141) of the second shaft coupling block (14) is connected to the pin hole (161) of the centrifugal sleeve (16), the first shaft coupling block (13) and the second shaft coupling block (14) are integrated with a straight pin hole (131) and a straight pin hole (142) through the straight pin (15), and a guide pole (132) matches a slot hole (171) in the centrifugal base (17), thereby achieving a smooth connection without making any noise.

What is claimed is:

1. A centrifugal switching device of a single-phase induction motor having a start winding comprising:
    a centrifugal means including: a centrifugal base fixed with a motor spindle tightly having a sleeve shape and a flange, the centrifugal base may being turned or stopped with the motor spindle together as a same body;
    a centrifugal sleeve being received on said centrifugal base and may be moved in axial direction, said centrifugal sleeve may be turned or stopped by the centrifugal base;
    a spring being received on an outer surface of said centrifugal base, one end of the spring being coupled to the flange of said centrifugal base and other end of the spring pushing said centrifugal sleeve in an axial direction of the spindle;
    a first shaft coupling block rotatably connected with said centrifugal sleeve at one end and hingedly connected with a second shaft coupling block at the other end; the second shaft coupling block connected with said first shaft coupling block being rotatably connected with said centrifugal base at other end;
    a winding pressure switch spaced apart in the axial direction and fixed beside said centrifugal means; when the single-phase induction motor is stopped under a force of the spring, said centrifugal sleeve pushes contact of said winding pressure switch, thereby the start winding is connected with a power, and the motor turning to a predetermined speed, under a centrifugal force said first and second shaft coupling blocks move in a radial direction to bring said centrifugal sleeve to leave the contacts of said winding pressure switch, thereby the start winding is disconnected from the power.

2. The centrifugal switching device of claim 1, wherein said centrifugal base is fixed on the motor spindle with an interference fit, the outside surface of said centrifugal base is provided with a spline, a slot is defined in an end face of said centrifugal base.

3. The centrifugal switching device of claim 1, wherein said centrifugal sleeve is received on the outside surface of said centrifugal base with slide-able spline connection, and holes for connection with said second shaft coupling block are defined on the body of said centrifugal sleeve.

4. The centrifugal switching device of claim 3, wherein said second shaft coupling block has two holes at both ends respectively, one hole is connected with the hole on said centrifugal sleeve by a pin, and the other hole is for the connection with said first shaft coupling block.

5. The centrifugal switching device of claim 4, wherein said first shaft coupling block has a hole at one end for connecting with the hole on said second shaft coupling block by a pin, a guide pole at other end is rotatably connected with the slot on the end face of said centrifugal base.

6. The centrifugal switching device of claim 1, wherein the first and second shaft coupling blocks are provided with round transition and a central sliding contact.

7. The centrifugal switching device of claim 1, wherein the spring is directly received on an outer cylindrical surface of the centrifugal base, the centrifugal sleeve moves axially under a uniform force exerted by the spring; an axial end surface of the centrifugal sleeve transiently releases contact of the winding pressure switch, so as to disconnect the start winding.

8. The centrifugal switching device of claim 1, wherein said winding pressure switch can accomplish circuit switching quickly under a small force and after a certain displacement.

9. The centrifugal switching device of claim 1, wherein said predetermined motor speed is 70%-80% of the synchronous speed of the motor.

10. The centrifugal switching device of claim 1, wherein further having a heater pressure switch affixed beside said centrifugal means with a distance in axial direction for controlling a heater.

* * * * *